(12) United States Patent
Tanabe et al.

(10) Patent No.: US 10,587,449 B2
(45) Date of Patent: Mar. 10, 2020

(54) SYSTEM AND METHOD TO USE LOCATION-AWARE DNS RESPONSES AS INPUT TO MEDIA RELAY SELECTION FOR WEBRTC

(71) Applicant: Avaya, Inc., Santa Clara, CA (US)

(72) Inventors: Jason G. Tanabe, Ontario (CA); Mehmet Balasaygun, Freehold, NJ (US); Adrian Lee, Ontario (CA); Jing (Jerry) Xie, Princeton, NJ (US)

(73) Assignee: Avaya Inc., Santa Clara, CA (US)

( * ) Notice: Subject to any disclaimer, the term of this patent is extended or adjusted under 35 U.S.C. 154(b) by 285 days.

(21) Appl. No.: 15/653,239

(22) Filed: Jul. 18, 2017

(65) Prior Publication Data

US 2018/0019909 A1    Jan. 18, 2018

Related U.S. Application Data

(60) Provisional application No. 62/363,722, filed on Jul. 18, 2016.

(51) Int. Cl.
*H04L 29/06* (2006.01)
*H04L 29/12* (2006.01)
(Continued)

(52) U.S. Cl.
CPC .... *H04L 29/06176* (2013.01); *H04L 61/1511* (2013.01); *H04L 61/6013* (2013.01); *H04L 65/105* (2013.01); *H04L 65/1069* (2013.01); *H04L 65/4084* (2013.01); *H04L 67/18* (2013.01); *H04L 61/609* (2013.01); *H04L 67/02* (2013.01); *H04W 4/18* (2013.01)

(58) Field of Classification Search
CPC .......... H04L 29/06176; H04L 61/1511; H04L 61/6013; H04L 65/105; H04L 65/1069; H04L 65/4084; H04L 67/18; H04L 61/609; H04L 67/02; H04W 4/18
See application file for complete search history.

(56) References Cited

U.S. PATENT DOCUMENTS 6,128,644 A * 10/2000 Nozaki ................... G06F 9/505
                                                                      709/201
8,601,144 B1    12/2013 Ryner
(Continued)

*Primary Examiner* — Wing F Chan
*Assistant Examiner* — Billy H Ng
(74) *Attorney, Agent, or Firm* — Sheridan Ross P.C.

(57) ABSTRACT

A region specific proxy server receives a first request to establish a communication session from a communication device. The first request is based on an address of the region specific proxy server identified by a DNS server. The region specific proxy server generates and sends, to a media control service, a second request to identify a region specific media relay. The second request comprises the address of the region specific proxy server. The proxy server receives, from the media control service, an address of the region specific media relay that is selected based on the address of the region specific proxy server. The proxy server sends the address of the region specific media relay to the communication device. The communication device uses the address of the region specific media relay to establish a media communication session (e.g., a voice media communication session) using the region specific media relay.

20 Claims, 7 Drawing Sheets

(51) Int. Cl.
*H04L 29/08* (2006.01)
*H04W 4/18* (2009.01)

(56) References Cited

U.S. PATENT DOCUMENTS

| | | |
|---|---|---|
| 2014/0241215 A1 | 8/2014 | Massover et al. |
| 2015/0120879 A1 | 4/2015 | Yoakum et al. |
| 2016/0127260 A1* | 5/2016 | Gordon ................ H04L 47/783 709/226 |
| 2017/0295475 A1* | 10/2017 | Patel ....................... H04W 4/10 |

* cited by examiner

SYSTEM AND METHOD TO USE LOCATION-AWARE DNS RESPONSES AS INPUT TO MEDIA RELAY SELECTION FOR WEBRTC

CROSS REFERENCE TO RELATED APPLICATION

The present application claims the benefits of U.S. Provisional Application Ser. No. 62/363,722, filed Jul. 18, 2016, entitled "System and Method to Use Region-Aware DNS Responses as Input to Media Relay Selection for WebRTC", which is incorporated herein by this reference in its entirety.

FIELD

The disclosure relates generally to networked communication systems and particularly to providing media relay services for networked communication services.

BACKGROUND

Media relays are typically used to provide Network Address Translation (NAT) traversal for media streams (e.g., a voice media stream) in a communication session. Large Enterprises and applications hosted in data centers may have multiple media relays distributed throughout the world in order to handle traffic that is not sent directly between communication devices. For example, a communication session between a Web Real-Time Communication (WebRTC) communication device and a second communication device on the Public Switched Telephone Network (PSTN) may need to use a media relay.

WebRTC client applications use Domain Name System (DNS) to resolve hostnames to Internet Protocol (IP) addresses to determine where to send Hypertext Transfer Protocol (HTTP) requests. Consistent with other Hyper Text Markup Language (HTML) content on the web, many service providers use location-aware DNS to ensure browser traffic in a geographical region is served by the data center closest to the physical location of the browser. This may be because of performance issues, but it could also be because of regulatory or localization issues (e.g., providing text in different languages). For example, a user doing a Google™ search in North America will not use the same data center to get the same response as a user doing the same Google™ search in Asia. This solution works well for basic web traffic. However, this solution falls short when a communication session needs to use a media relay.

SUMMARY

These and other needs are addressed by the various embodiments and configurations of the present disclosure. A region specific proxy server receives a first request to establish a communication session from a communication device. The first request is based on an address of the region specific proxy server identified by a DNS server. The region specific proxy server generates and sends, to a media control service, a second request to identify a region specific media relay. The second request comprises the address of the region specific proxy server. The proxy server receives, from the media control service, an address of the region specific media relay that is selected based on the address of the region specific proxy server. The proxy server sends the address of the region specific media relay to the communication device. The communication device uses the address of the region specific media relay to establish a media communication session (e.g., a voice media communication session) using the region specific media relay.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 1.12(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
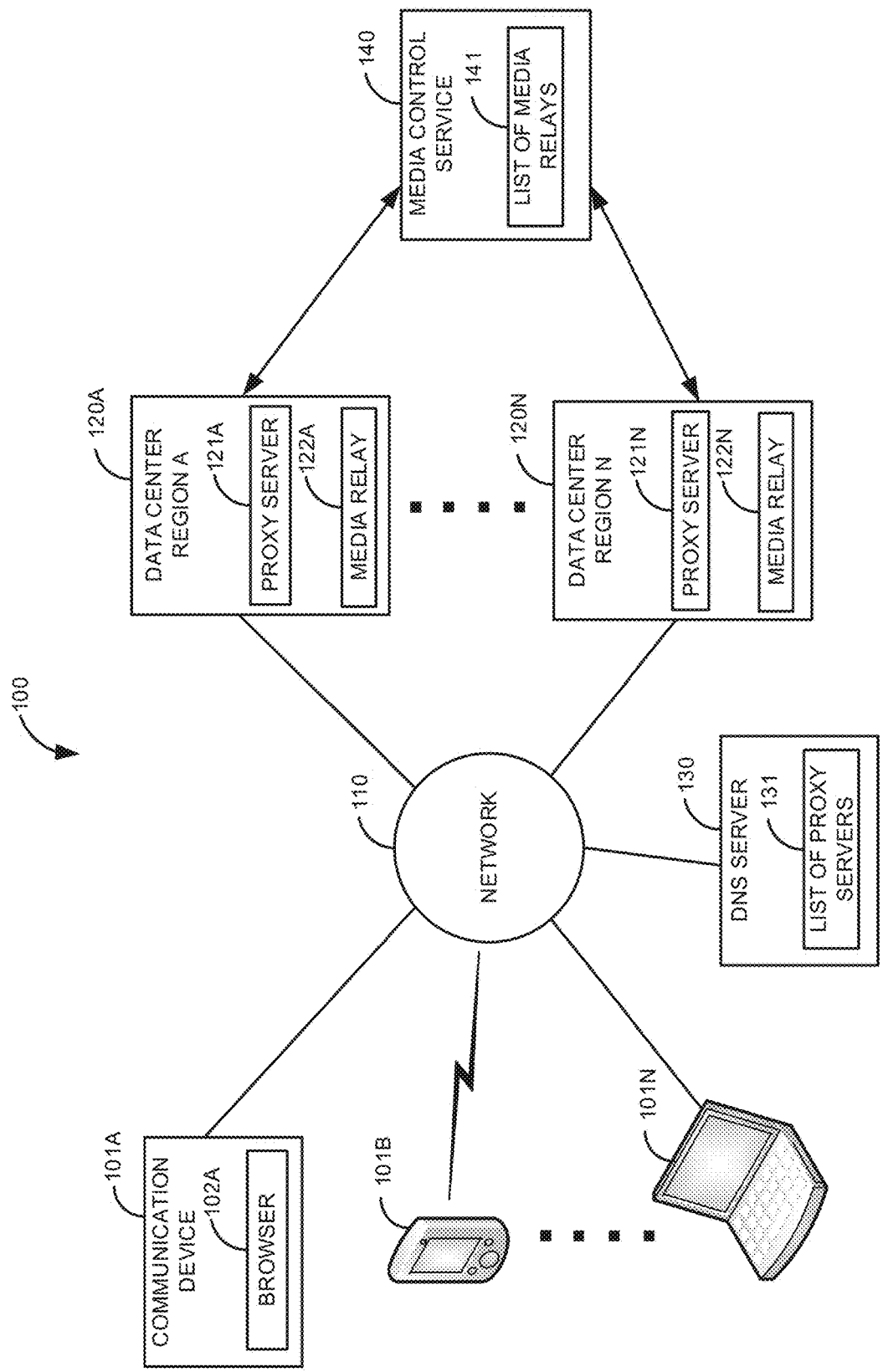
FIG. 1 is a block diagram of a first illustrative system for a using a location-aware DNS response as input for media relay selection.

FIG. 1 is a block diagram of a first illustrative system 100 for a using location-aware DNS response as input for media relay 122 selection. The first illustrative system 100 comprises communication devices 101A-101N, a network 110, data centers 120A-120N, a DNS server 130, and a media control service 140.

The communication devices 101A-101N can be or may include any hardware communication device that can communicate on the network 110, such as a Personal Computer (PC), a telephone, a video system, a cellular telephone, a Personal Digital Assistant (PDA), a tablet device, a note-book device, a web server, a media server, a smart phone, a conference bridge, and/or the like. As shown in FIG. 1, any number of communication devices 101A-101N may be connected to the network 110.

The communication device 101A further comprises a browser 102A. The browser 102A may be any browser 102, such as Google Chrome™, Firefox™, Opera™ Internet Explorer™, Safari™, and/or the like. Although not shown, communication devices 101B-101N may also comprise a browser 102.

Although not shown, the communication device 101 may also comprise an application. For example, a WebRTC application may be installed on the communication device 101A.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Web Real-Time Communication (WebRTC), Hypertext Transfer Protocol (HTTP), Hyper Text Markup Language (HTML), Integrated Services Digital Network (ISDN), and/or the like. Thus, the network 110 is an electronic communication network 110 configured to carry messages via packets and/or circuit switched communications.

The data centers 120A-120N can be or may include any hardware coupled with software that provides services via the network 110. The data centers 120A-120N are data centers 120 in different regions. For example, the data center 120A may be in the United States and the data center 120N may be in India. The data centers 120A-120N may be part of a cloud service provided by a service provider and may be located in different regions throughout the world.

Although not shown, the data centers 120A-120N may comprise other services, such as, media servers, video conferencing services, voice conferencing services, call recording services, email services, Instant Messaging (IM) services, text messaging services, and/or the like.

The data centers 120A-120N further comprise proxy servers 121A-121N and media relays 122A-122N. The proxy servers 121A-121N can be or may include any hardware coupled with software that is used to facilitate a communication session, such as a HTTP proxy server 121. The proxy servers 121A-121N can facilitate different kinds of communication sessions, such as HTTP communication sessions, WebRTC communication sessions, video communication sessions, IM communication sessions, SIP communication sessions, H.323 communication sessions, a combination of these, and the like. Although not shown, a data center 120 may comprise one or more proxy servers 121.

The proxy servers 121A-121N are typically region specific proxy servers 121A-121N. This means that the proxy server 121 typically services requests for communication sessions from communication devices 101 in the same region.

The media relays 122A-122N can be or may include any hardware coupled with software that provides media services for a communication session. For example, the media relay 122 may provide Network Address Translation (NAT), transcoding between two or more codecs, changing of encryption levels, conversion from a first protocol to a second protocol (e.g., Real-Time Protocol (RTP) or Real- Time Control Protocol (RTCP)), conference recording, conference mixing, and/or the like. Although not shown, an individual data center 120 may comprise any number of media relays 122.

In a communication session, the communication session is initially established between two or more communication devices 101A-101N. For example, HTTP/WebRTC may be used to establish a voice communication session between the communication devices 101A and 101N via the proxy server 121A. Once the communication session is established, a separate media communication session is then established for the voice data. The voice media communication session may be established, via the media relay 122A, using RTP and RTCP. The media relay 122A may provide one or more media services for the media communication session. For example, the media relay 122A may provide NAT between IP addresses of the communication device 101A (e.g., non-routable IP addresses) and the communication device 101N (e.g., routable IP addresses).

The DNS server 130 can be or may include any hardware coupled with software that provides domain naming services for the communication devices 101A-101N. The DNS server 130 typically receives a request from one of the communication devices 101 to provide a DNS lookup for a Uniform Resource Identifier (URL). The DNS server 130 looks up the URL to identify an IP address associated with the URL. For example, the URL may be "google.com." When the DNS server 130 receives the URL for "google.com" the DNS server 130 provides an IP address of how to reach google.com (e.g., via a region specific proxy server 121).

In FIG. 1, the DNS server 130 is a location-aware DNS server 130. A location-aware DNS server 130 ensures browser traffic in a geographical region is served by the data center 120 that is typically closest to the physical location of the browser. For example, a user doing a Google™ search in North America does not use the same data center 120 to get the same response as a user doing the same Google™ search in Asia.

To provide location-aware DNS, the DNS server 130 further comprises a list of proxy servers 131. The list of proxy servers 131 contains IP addresses of the proxy servers 121A-121N. The DNS server 130 compares an IP address of the communication device 101 to identify the proxy server 121 that is in the same region. For example, assume that the data center 120A is in the United States and the data center 120N is in India. If a request for a communication session was received from the communication device 101A, which is in the United States, the DNS server 130 looks up the proxy server 121A that is in the same region (the United States).

The media control service 140 can be any hardware coupled with software that provides media control services. For example, the media control service 140 may be a WebRTC service. The media control service 140 provides IP addresses of media relays 122A-122N in different regions. The media control service 140 provides the IP addresses of the media relays 122A-122N based on a list of media relays 141. The media control service 140 identifies the media relay 122 that is typically physically closest to the communication device 101 requesting the communication session. The purpose of identifying the media relay 122 that is physically closest to the requesting communication device is because media (e.g., voice and video) is time sensitive. If the communication device 101 is in the United States and the media relay 122 is in India, the delay caused by selecting a media relay 122 that is not physically closest to the communication device 101 may cause poor voice/video for the media communication session.

Figure 2:
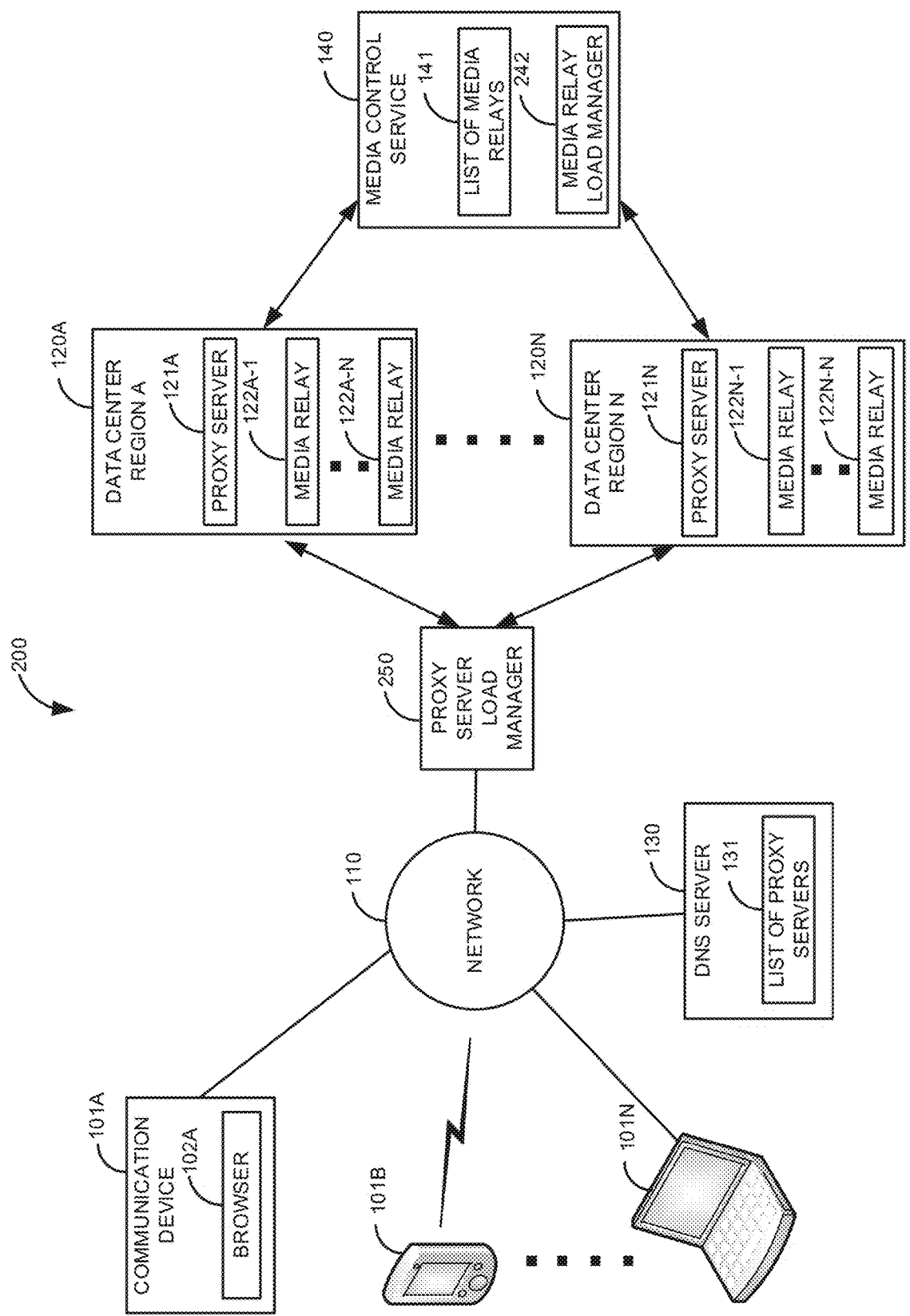
FIG. 2 is a block diagram of a second illustrative system for a using location-aware DNS response as input for media relay selection using one or more load managers.

FIG. 2 is a block diagram of a second illustrative system 200 for using a location-aware DNS response as input for media relay 122 selection using one or more load managers 242/250. The second illustrative system 200 comprises the communication devices 101A-101N, the network 110, the data centers 120A-120N, the DNS server 130, the media control service 140, and a proxy server load manager 250. In addition, the data centers 120A-120N each comprises multiple media relays (122A-1 to 122A-N and 122N-1 to 122N-N) and the media control service 140 further comprises a media relay load manager 242.

The proxy server load manager 250 can be or may include any hardware coupled with software that manages loads for the proxy servers 121A-121N. The proxy server load manager 250 determines a load factor for each of the proxy servers 121A-121N. For example, the proxy server load manager 250 may determine how loaded a proxy server 121 is based on a number of requests for a communication session that are sent to the proxy server 121 within a given period of time. The proxy server load manager 250 may determine how loaded the proxy servers 121A-121N are based on receiving a message from each of the proxy servers 121A-121N. For example, the proxy servers 121A-121N may send periodic update messages to the proxy server load manager 250.

When the DNS server 130 directs a communication device 101 to a proxy server 121, the proxy server load manager 250 intercepts the message and determines the load factor for the proxy servers 121A-121N. If the proxy server 121A is physically closest (i.e., in a first best region), but is heavily loaded, the proxy server load manager 250 may send the request to the proxy server 121N (i.e., the second physically closest in a second best region). The advantage to using a different proxy server 121N is that load balancing can be achieved. Even though there may be more delay in connection establishment using the proxy server 121N, connection establishment is not as time sensitive as media; thus load balancing of media relays 122A-122N is a practical alternative that may use less physical resources.

In FIG. 2, the media control service 140 comprises the media relay load manager 242 for balancing multiple media relays 122 in the same data center 120 (region). For example, the data center 120A comprises media relays 122A-1 to 122A-N. In this example, the list of media relays 141 includes the multiple media relays 122A-1 to 122A-N in the data center 120A. Likewise, the list of media relays 141 includes media relays 122N-1 to 122N-N. The media relay load manager 242 identifies a specific media relay 122A-1 to 122A-N in the data center 120A based on which media relay 122 in the data center 120A is the least loaded. The media relay load manager 242 may determine how loaded a media relay 122 in the data center 120 based on receiving a message from each of the media relays 122 in the data center 120. For example, the media relays 122A-1 to 122A-N in in the data center 120A may send periodic update messages to the media relay load manager 242.

Figure 3:
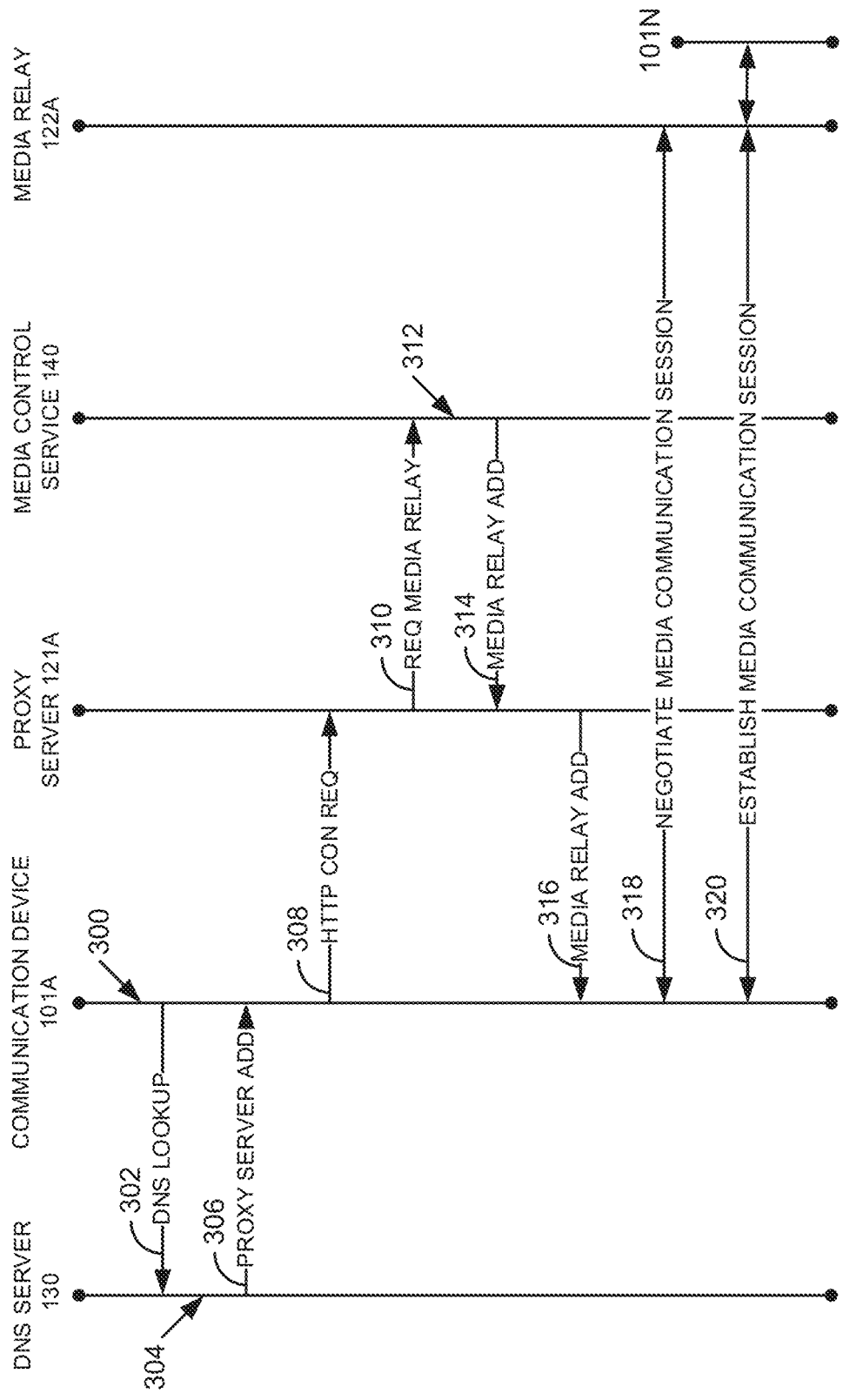
FIG. 3 is a flow diagram of a process for using a location-aware DNS response as input for media relay selection.

FIG. 3 is a flow diagram of a process for using a location-aware DNS response as input for media relay 122 selection. Illustratively, the communication devices 101A-101N, the data centers 120A-120N, the proxy servers 121A-121N, the media relays 122A-122N, the DNS server 130, the media control service 140, the media relay load manager 242, and the proxy server load manager 250 are stored-program-controlled entities, such as a computer or microprocessor, which perform the method of FIGS. 3-7 and the processes described herein by executing program instructions stored in a hardware computer readable storage medium, such as a memory (i.e., a computer memory, a hard disk, and/or the like). Although the methods described in FIGS. 3-7 are shown in a specific order, one of skill in the art would recognize that the steps in FIGS. 3-7 may be implemented in different orders and/or be implemented in a multi-threaded environment. Moreover, various steps may be omitted or added based on implementation.

The processes of FIGS. 3-7 are exemplary embodiments that are described using HTTP and WebRTC. However, the scope of FIGS. 3-7 is not limited specifically to HTTP and WebRTC. One or ordinary skill in the art would recognize that the processes described in FIGS. 3-7 may be implemented using other protocols, such as SIP, H.323, video protocols, and/or the like. In addition, HTTP and/or WebRTC may be used in conjunction with other protocols such as SIP, H.323, video protocols, and/or the like.

The process starts in step 300 when an action causes a request for a DNS lookup. For example, a user at the communication device 101A may enter a URL in the browser 102A. The URL may be a host name of a WebRTC service. As a result, the communication device 101A sends, in step 302, a HTTP request to the DNS server 130 to do a DNS lookup for the URL. Alternatively, an application (e.g., a WebRTC application) in the communication device 101A may send a URL to the DNS server 130 to do a DNS lookup. Upon receiving the HTTP request to do a DNS lookup, the DNS server 130 does a region specific lookup to determine an IP address of a proxy server 121 that is physically closest to the communication device 101A. For example, the DNS server 130 accesses the list of proxy servers 131. The list of proxy servers 131 contains one or more ranges of IP addresses of communication devices 101 that are used in each region. A range of IP addresses for a region correlates to a specific proxy server 121 in the region. The DNS server 130 looks up, in step 304, using the list of proxy servers 131, the IP address of the communication device 101A to identify the corresponding IP address of the proxy server 121A in the same region. The DNS server 130 sends, to the communication device 101A, a HTTP response with the IP address of the proxy server 121A in step 306. In this example, the DNS server 130 only sends the IP address of the proxy server 121A (the closest proxy server 121). However, in other embodiments, the DNS server 130 may send a prioritized list of proxy servers (e.g., a subset of the list of proxy servers 131). The prioritized list of proxy servers is prioritized based on how close the proxy servers 121 are to the communication device 101A.

The communication device 101A receives the IP address of the proxy server 121A in step 306. The communication device 101A sends, in step 308, to the proxy server 121A, a HTTP message to setup a WebRTC communication session with the communication device 101N. The proxy server 121A sends, in step 310, a HTTP/WebRTC request to the media control service 140. The HTTP/WebRTC request of step 310 includes the IP address of the proxy server 121A. For example, the IP address of the proxy server 121A may be in a proprietary HTTP header, in an existing header, in the sender's IP address, and/or the like.

The media control service 140 receives the HTTP/WebRTC message of step 310. The media control service 140 identifies the region/media relay 122A associated with the IP address of the proxy server 121A from the list of region specific media relays 141 in step 312. In this example, there is only a single media relay 122A in the region. The media control service 140 sends, in step 314, the IP address of the media relay 122A to the proxy server 121A in a HTTP/WebRTC message. The proxy server 121A then sends, in step 316, the IP address of the media relay 122A to the communication device 101A in a HTTP message.

At this point, because the communication device 101A has the IP address of the media relay 122A, the communication device 101 can negotiate the media communication session with the media relay 122A in step 318. For example, the communication device 101A may negotiate which codecs to use in an RTP or RTCP media communication session. The media communication session is then established in step 320. For example, the communication devices 101A and 101N engage in a video communication session.

In one embodiment, the DNS server 130 provides the IP address of the region specific media relay 122A (along with the IP address of the region specific proxy server 121A) directly to the communication device 101A in step 306. In this embodiment, steps 308-316 are unnecessary. After receiving the IP address of the media relay 122A in step 306, the communication device 101A can negotiate the media communication session with the media relay 122A in step 318. The media relay can then establish the media communication session in step 320.

In another embodiment, the DNS server 130 provides a regional domain name (in addition to the address of the proxy server 122) that is used to identify a media relay 122 (e.g., All-MediaRelay.company.com). The regional domain name is then passed along in steps 308 and 310. The media control service 140, in step 312, uses the regional domain name to identify to resolve the closest media relay 122A (i.e., a sub domain) pointing to a specific media relay (e.g., US-MediaRelay.company.com). For example, there may be multiple media relays 122 in the region and the media control service may identify a specific media relay 122 in the region (e.g., the closest media relay, a less loaded media relay 122, or a media relay 122 that has not failed).

Figure 4:
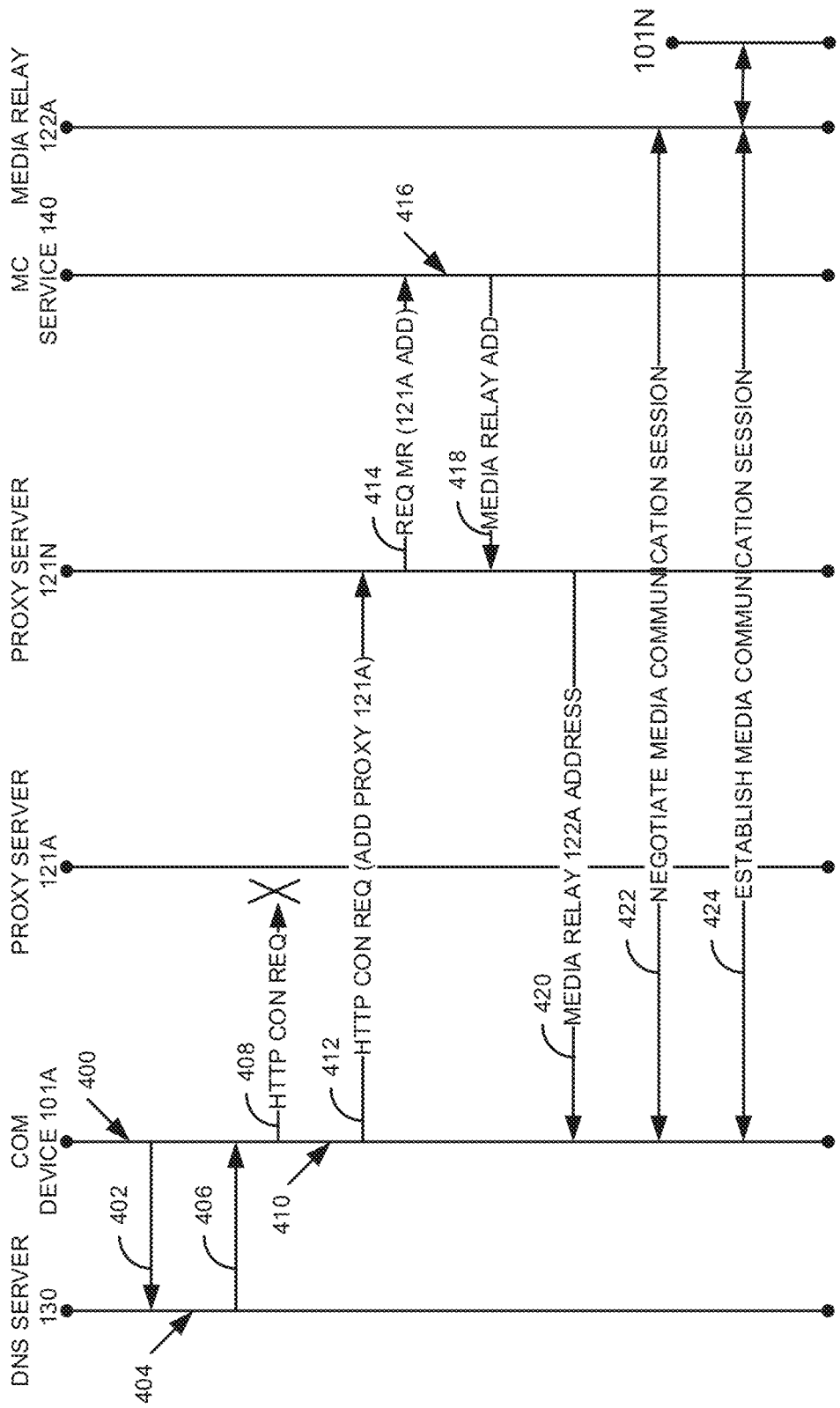
FIG. 4 is a flow diagram of a process for using a location-aware DNS response as input for media relay selection when a proxy server has failed or is unavailable.

FIG. 4 is a flow diagram of a process for using a location-aware DNS response as input for media relay 121 selection when a proxy server 121 has failed or is unavailable. Like in FIG. 3, the communication device 101A sends, in step 402, a HTTP request to the DNS server 130 to do a DNS lookup for the URL based on an action 400. Upon receiving the HTTP request to do a DNS lookup, the DNS server 130 does a region specific lookup to determine an IP address of a proxy server 121 that is physically closest to the communication device 101A in step 404. In this embodiment, the DNS server 130 not only looks up the IP address of the proxy server 121A in the same region as discussed previously in FIG. 3, the DNS server 130 also identifies one or more additional IP addresses of the next best proxy server(s) 121 (i.e., those that are physically closest) to provide a prioritized list of proxy servers. For example, the prioritized list of proxy servers (e.g., a subset of the list of proxy servers 131) will include at least the proxy server 121A (the closest proxy server 121) and the proxy server 121N (the second closest proxy server 121). The DNS server 130 sends a HTTP response with the IP addresses of the prioritized list of proxy servers 131 in step 406.

The communication device 101A receives the IP addresses of the prioritized list of proxy servers in step 406. The communication device 101A sends, in step 408, to the proxy server 121A (the best proxy server 121), a HTTP message to setup a WebRTC communication session with the communication device 101N. In this example, the proxy server 121A has failed or is unavailable. The proxy server 121A may have failed or be unavailable for various reasons, such as, a hardware failure, a software failure, a mechanical failure, a power outage, a network 110 failure, a cable failure, a service disruption, and/or the like.

The communication device 101A determines that the proxy server 121A has failed or is unavailable in step 410. For example, the communication device 101A may determine that the proxy server 121A has failed or is unavailable because one or more responses were not received within a time period. The communication device 101A sends a second HTTP message, to the proxy server 121N (the second best proxy server from the list received in step 406) to setup the WebRTC communication session with the communication device 101N in step 412. The second HTTP message of step 412 also includes the IP address of the failed or unavailable proxy server 121A.

The proxy server 121N sends, in a request to get the media relay IP address, the IP address of the failed or unavailable proxy server 121A to the media control service 140 in step 414 in a HTTP/WebRTC message. The IP address of the failed or unavailable proxy server 121A may be in a proprietary HTTP/WebRTC header, in an existing header, in a payload, and/or the like. By sending the IP address of the failed or unavailable proxy server 121A, the media control service 140 can still determine the media relay 122A that is in the same region (closest to) as the communication device 101A. If the HTTP message of step 414 only contained the IP address of the proxy server 121N, the media control service 140 would select the media relay 122N, which is not the ideal media relay 122A. The media control service 140 selects, using the IP address of the failed or unavailable proxy server 121A, the media relay 122A in the same region, in step 416, from the list of region specific media relays 141.

The media control service 140 sends a HTTP/WebRTC message with the IP address of the media relay 122A to the proxy server 121N in step 418. The proxy server 121N sends a HTTP message with the IP address of the media relay 122A to the communication device 101A in step 420. At this point, because the communication device 101A has the IP address of the media relay 122A, the communication device 101 can negotiate the media communication session with the media relay 122A in step 422. For example, the communication device 101A may negotiate which codecs to use in an RTP or RTCP media communication session with the media relay 122A. The media communication session is then established in step 424. For example, the communication devices 101A and 101N engage in a voice communication session.

Figure 5:
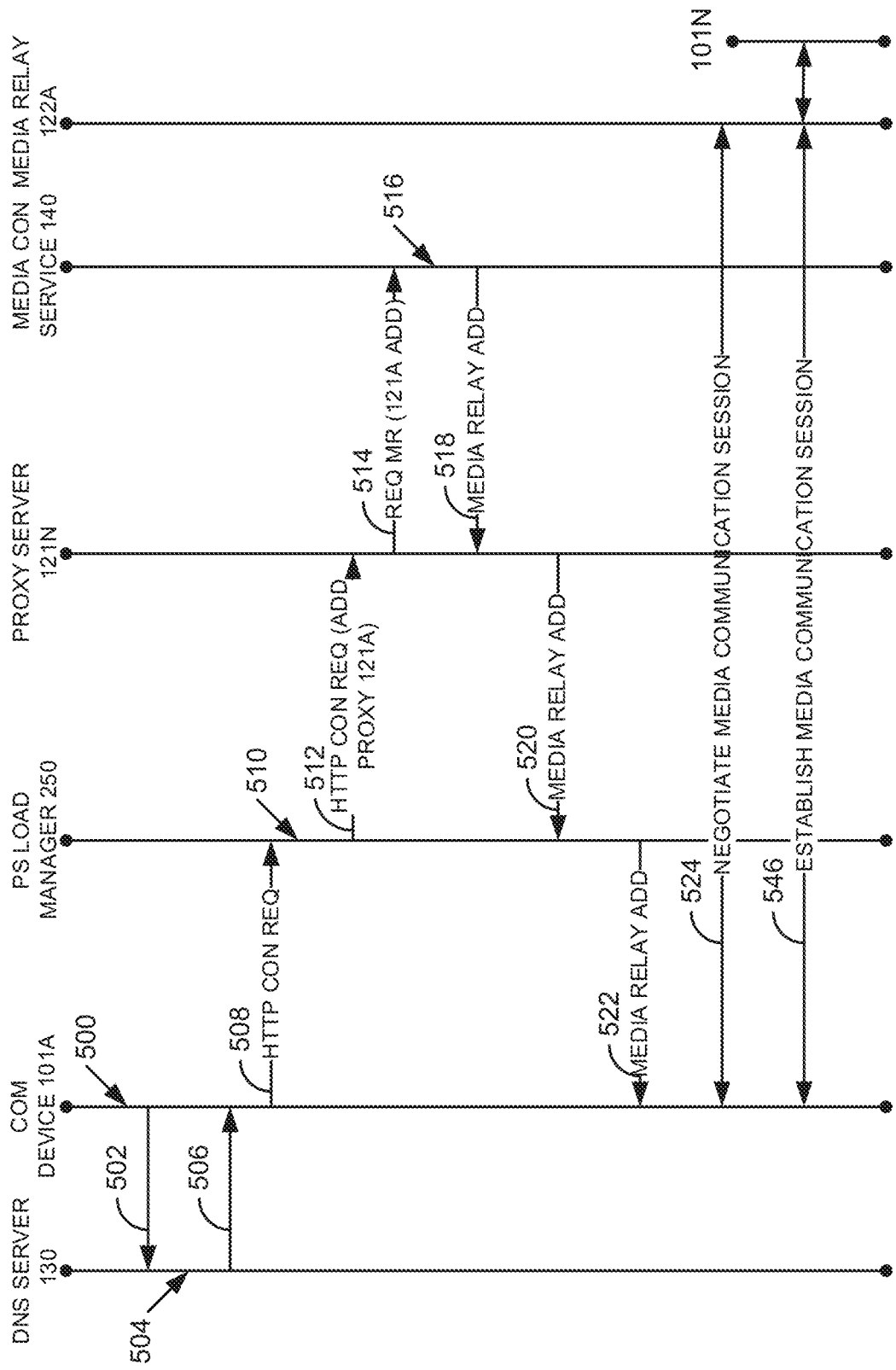
FIG. 5 is a flow diagram of a process for using a location-aware DNS response as input for media relay selection when a proxy server is overloaded.

FIG. 5 is a flow diagram of a process for using a location-aware DNS response as input for media relay 122 selection when a proxy server 121 is overloaded. Like in FIG. 3, the communication device 101A sends, in step 500, a HTTP request to the DNS server 130 to do a DNS lookup for the URL based on an action 500. Upon receiving the HTTP request to do a DNS lookup, the DNS server 130 does a lookup (may or may not be region specific) to determine an IP address of the proxy server load manager 250 in step 504. This is because the proxy server load manager 250 front ends all initial communication requests for the proxy servers 121A-121N. The DNS server 130 sends a HTTP response with the IP address of the proxy server load manager 250 in step 506.

The communication device 101A receives the IP address of the proxy server load manager 250 in step 506. The communication device 101A sends, in step 508, to the proxy server load manager 250, a HTTP message to setup a WebRTC communication session with the communication device 101N. The proxy server load manager 250 determines if the best proxy server 121A is too heavily loaded (or failed/unavailable) in step 510. The proxy server load manager 250 may determine if the best proxy server 121A is too heavily loaded in various ways, such as, based on querying the proxy server 121A to get its load status. The proxy server load manager 250 can then determine if the load status is over a defined threshold. If the proxy server load manager 250 determines that the best proxy server 121A is too heavily loaded (or failed/unavailable), the proxy server load manager 250 sends a HTTP message, to the proxy server 121N (the second best proxy server 121) to setup the WebRTC communication session with the communication device 101N in step 512. The HTTP message of step 512 also includes the IP address of the overloaded, failed, or unavailable proxy server 121A.

The proxy server 121N sends, in a request to get the IP address of the media relay 122A, the IP address of the overloaded, failed, or unavailable proxy server 121A to the media control service 140 in step 514 in a WebRTC message. The IP address of the overloaded, failed, or unavailable proxy server 121A may be in a proprietary HTTP/WebRTC header, in an existing header, in a payload, and/or the like. By sending the IP address of the overloaded, failed, or unavailable proxy server 121A, the media control service 140 can still determine a media relay 122A that is in the same region (closest to) as the communication device 101A. If the HTTP message of step 514 only contained the IP address of the proxy server 121N, the media control service 140 would select the media relay 122N, which is not the ideal media relay 122N. The media control service 140 selects, using the IP address of the overloaded, failed, or unavailable proxy server 121A, the media relay 122A in the same region in step 516 from a list of region specific media relays 141.

The media control service 140 sends a WebRTC message with the IP address of the media relay 122A to the proxy server 121N in step 518. The proxy server 121N sends a HTTP message with the IP address of the media relay 122A to the proxy server load manager 250 in step 520. The proxy server load manager 250 sends a HTTP message with the IP address of the media relay 122A to the communication device 101A in step 522.

At this point, because the communication device 101A has the IP address of the media relay 122A, the communication device 101 can negotiate the media communication session with the media relay 122A in step 524. For example, the communication device 101A may negotiate which codecs to use in an RTP or RTCP media communication session with the media relay 122A. The media communication session is then established in step 526. For example, the communication devices 101A and 101N engage in a multimedia communication session.

Figure 6:
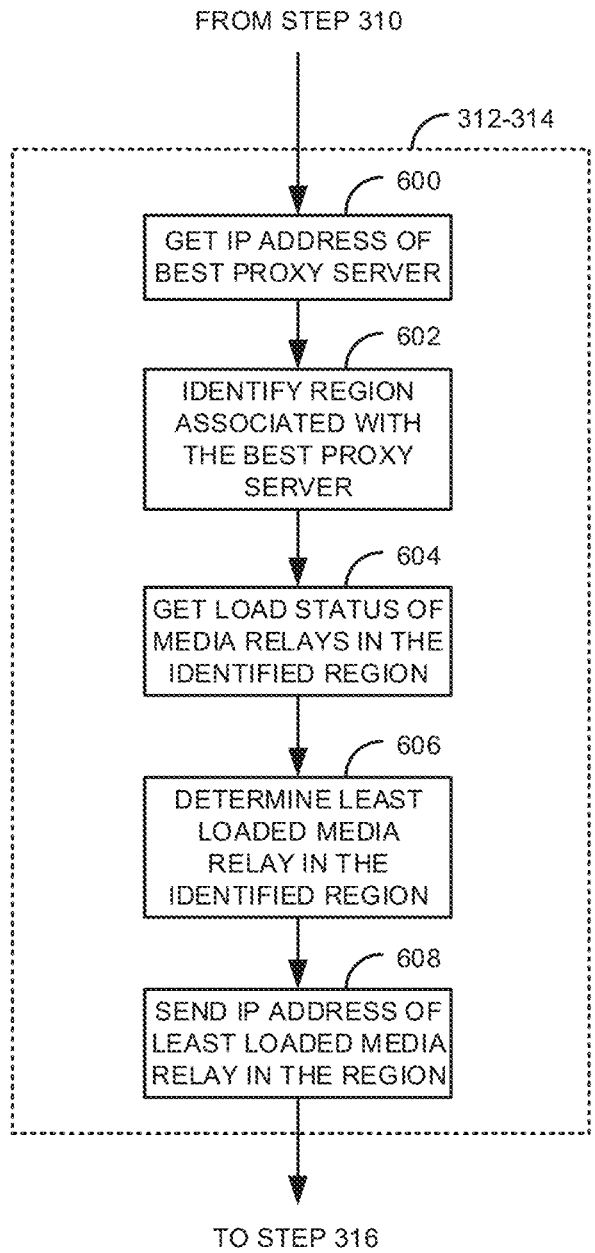
FIG. 6 is a flow diagram of a process for identifying a least loaded media relay in a region.

FIG. 6 is a flow diagram of a process for identifying a least loaded media relay 122 in a region. The process of FIG. 6 is an exemplary embodiment for steps 312-314 of FIG. 3. The process of FIG. 6 may also be used for steps 416-418 of FIG. 4 and steps 516-518 of FIG. 5.

After the media control service 140 receives the request for a media relay 122 in step 310, the media relay load manager 242 gets, in step 600, the IP address of the proxy server 121A in the region from the message of step 310. The media relay load manager 242 identifies the region associated with the best proxy server 121A in step 602. The media relay load manager 242 gets, in step 604, the load status of the media relays 121A-1 to 121A-N in the identified region. For example, the media relay load manager 242 may get the load status of the media relays 122A-1 to 122A-N by querying the media relays 122A-1 to 122A-N.

The media relay load manager 242 determines the least loaded media relay 122 in the region in step 606. In this example, the media relay load manager 242 identifies the media relay 122A-1 because it is less loaded than the other media relays (122A-2 to 122A-N) in the region. The media relay load manager 242 sends, in step 608, the IP address of the least loaded media relay 122A-1 in the region to the proxy server 121A and then goes to step 316.

Figure 7:
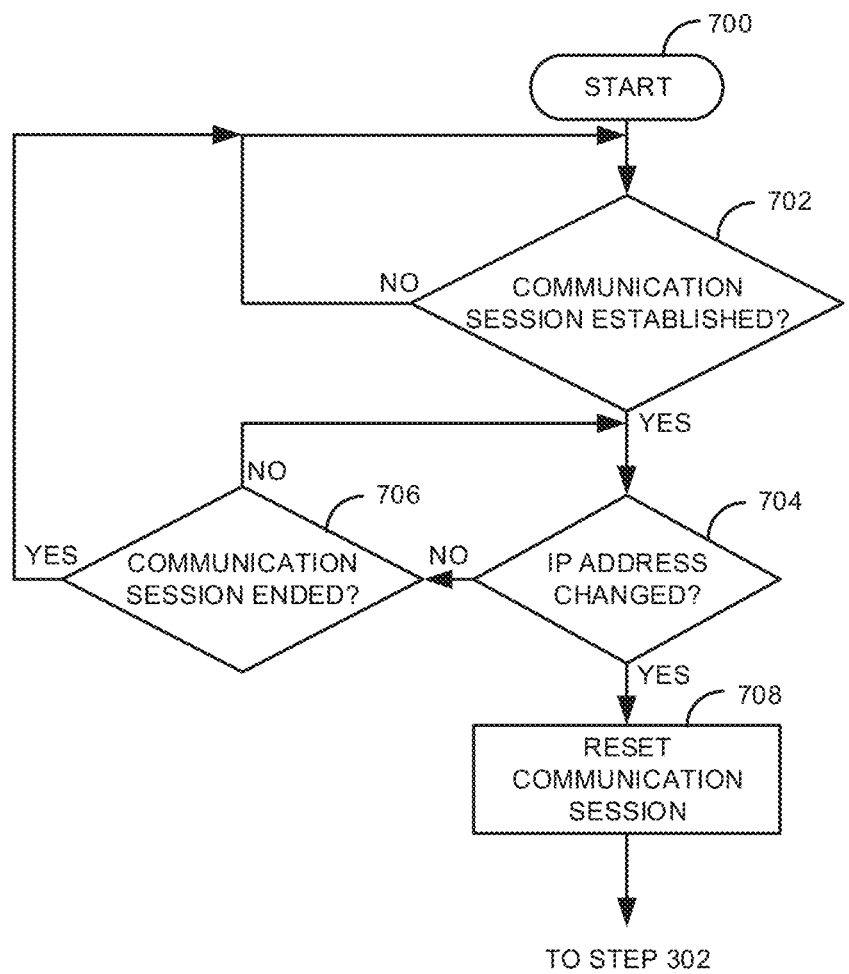
FIG. 7 is a flow diagram of a process for reestablishing a media communication session when an IP address of a communication device changes.

FIG. 7 is a flow diagram of a process for reestablishing a media communication session when an IP address of a communication device 101 changes. The process starts in step 700. The communication device 101A and/or the proxy server 121A determines if the communication session has been established in step 702. If the communication session has not been established in step 702, the process of step 702 repeats.

If the communication session has been established in step 702, the communication device 101A and/or the proxy server 121A determines if the IP address of the communication device 101A has changed. For example, the IP address of the communication device 101A may change when the communication device 101A switches from a cellular connection to a WiFi connection, the communication device 101A switches from a first carrier to a second carrier, the communication device 101A switches from one cell tower to another cell tower, and/or the like. If the IP address has not changed in step 704, the communication device 101A and/or proxy server 121A determines if the communication session has ended in step 706. If the communication session has ended in step 706, the process goes to step 700.

Otherwise, if the communication session has not ended in step 706, the process goes to step 704. If the IP address has changed in step 704, the communication device 101A and/or proxy server 121A resets the connection and the process goes to step 302 to do DNS lookup and repeat the process of FIG. 3 for the new IP address of the communication device 101A.

The change of the IP address may result in a different proxy server 121 and a different media relay 122 (e.g., proxy server 121N and media relay 122N) being selected for the communication session. For example, when the DNS server 130 determines the region specific proxy server 121 in step 304, based in the new IP address of the communication device 101A, a different proxy server 121 (e.g., proxy server 121N) may be selected, which results in a different media relay (e.g., media relay 122N) being selected.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJ-S™ processors, other industry-equivalent processors, and may perform computational functions using any known or future-developed standard, instruction set, libraries, and/or architecture.

Any of the steps, functions, and operations discussed herein can be performed continuously and automatically.

To avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any region within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method comprising:
   receiving, by a microprocessor, a first request to establish a communication session based on an address of a first region specific proxy server;
   generating, by the microprocessor, a second request to identify a first region specific media relay, wherein the second request comprises the address of the first region specific proxy server;
   sending, by the microprocessor, the second request to a media control service;
   receiving, by the microprocessor and from the media control service, an address of the first region specific media relay; and
   sending, fey the microprocessor, the address of the first region specific media relay to a first communication device for establishing a media communication session using the first region specific media relay.

2. The method of claim 1, wherein the media control service uses the address of the first region specific proxy server to select the first region specific media relay from a list of region specific media relays.

3. The method of claim 1, wherein the first region specific proxy server is in a second best region, the first region specific media relay is in a first best region, and a second region specific proxy server is in the first best region,
   wherein the address of the first region specific proxy server is selected from a prioritized list of addresses of region specific proxy servers based on the second region specific proxy server failing, being unavailable, or being overloaded,
   wherein the second request to identify the first region specific media relay comprises an address of the failed, unavailable, or overloaded second region specific proxy server, and
   wherein the media control service uses the address of the failed, unavailable, or overloaded second region specific proxy server to select the first region specific media relay.

4. The method of claim 3, wherein the media control service uses the address of the failed, unavailable, or overloaded second region specific proxy server to select the first region specific media relay from a list of region specific media relays.

5. The method of claim 3, wherein the second request is a Hypertext Transfer Protocol (HTTP) request and wherein the address of the failed, unavailable, or overloaded second region specific proxy server is in a proprietary HTTP header.

6. The method of claim 1, wherein the first communication device selects the address of the first region specific proxy server from a prioritized list of addresses of region specific proxy servers.

7. The method of claim 1, wherein the first region specific proxy server is an Hypertext Transfer Protocol (HTTP) proxy server, wherein the first request a first HTTP request, and wherein the second request is a Web Real-Time Communication (WebRTC) protocol message.

8. The method of claim 1, further comprising:
establishing the media communication session using the first region specific media relay, wherein the first region specific media relay provides at least one of network address translation, transcoding between two or more codecs, changing of encryption levels, conversion from a first protocol to a second protocol, and conference recording.

9. The method of claim 1, further comprising:
establishing the media communication session using the first region specific media relay;
detecting that an Internet Protocol (IP) address of the first communication device has changed during the media communication session; and
in response to detecting the IP address of the first communication device changing during the media communication session, using a second region specific proxy server and a second region specific media relay to re-establish the media communication session.

10. The method of claim 1, wherein the first region comprises a plurality of media relays and wherein the second request to identify the first region specific media relay results in a selection of a least oaded media relay from the plurality of media relays in the first region.

11. A system comprising:
a first region specific proxy server comprising a microprocessor and memory coupled with the microprocessor, wherein the memory comprises instructions that enable the microprocessor to,
receive a first request to establish a communication session based on an address of the first region specific proxy server;
generate a second request to identify a first region specific media relay, wherein the second request comprises the address of the first region specific proxy server;
send the second request to a media control service;
receive, from the media control service, an address of the first region specific media relay; and
send the address of the first region specific media relay to a first communication device for establishing a media communication session using the first region specific media relay.

12. The system of claim 11, wherein the media control service uses the address of the first region specific proxy server to select the first region specific media relay from a list of region specific media relays.

13. The system of claim 11, wherein the first region specific proxy server is in a second best region, the first region specific media relay is in a first best region, and a second region specific proxy server is in the first best region,
wherein the address of the first region specific proxy server is selected from a prioritized list of addresses of region specific proxy servers based on the second region specific proxy server failing, being unavailable, or being overloaded,
wherein the second request to identify the first region specific media relay comprises an address of the failed, unavailable, or overloaded second region specific proxy server, and
wherein the media control service uses the address of the failed, unavailable, or overloaded second region specific proxy server to select the first region specific media relay.

14. The system of claim 13, wherein the media control service uses the address of the failed, unavailable, or overloaded second region specific proxy server to select the first region specific media relay from a list of region specific media relays.

15. The system of claim 13, wherein the second request is a Hypertext Transfer Protocol (HTTP) request and wherein the address of the failed, unavailable, or overloaded second region specific proxy server is in a proprietary HTTP header.

16. The system of claim 11, wherein a proxy server load manager selects the address of the first region specific proxy server from a prioritized list of addresses of region specific proxy servers.

17. The system of claim 11, wherein the first region specific proxy server is an Hypertext Transfer Protocol (HTTP) proxy server, wherein the first request a first HTTP request, and wherein the second request is a Web Real-Time Communication (WebRTC) protocol message.

18. The system of claim 11, wherein the first region specific media relay establishes the media communication session, wherein the first region specific media relay provides at least one of network address translation, transcoding between two or more codecs, changing of encryption levels, conversion from a first protocol to a second protocol, and conference recording.

19. The system of claim 11, wherein:
the first region specific media relay establishes the media communication session using the first region specific media relay; and
the first communication device or the first region specific proxy server detects that an Internet Protocol (IP) address of the first communication device has changed during the media communication session, and in response to detecting the IP address of the first communication device changing during the media communication session, using a second region specific proxy server and a second region specific media relay to re-establish the media communication session.

20. A server comprising:
a memory, and
a microprocessor in communication with the memory, the memory comprising instructions that, when executed by the microprocessor enable the microprocessor to:
receive a first request to establish a communication session based on an address of a first region specific proxy server;
generate a second request to identify a first region specific media relay, wherein the second request comprises the address of the first region specific proxy server;
send the second request to a media control service;

receive an address of the first region specific media relay; and send the address of the first region specific media relay to a first communication device for establishing a media communication session using the first region specific media relay.

\* \* \* \* \*

UNITED STATES PATENT AND TRADEMARK OFFICE
CERTIFICATE OF CORRECTION

PATENT NO. : 10,587,449 B2
APPLICATION NO. : 15/653239
DATED : March 10, 2020
INVENTOR(S) : Tanabe et al.

It is certified that error appears in the above-identified patent and that said Letters Patent is hereby corrected as shown below:

In the Claims

At Column 14, Line 43, after "sending," delete "fey" and insert --by-- therein.

At Column 15, Line 41, delete "oaded" and insert --loaded-- therein.

Signed and Sealed this
Twelfth Day of May, 2020

Andrei Iancu
*Director of the United States Patent and Trademark Office*